A. F. BRIAN.
MONOMOBILE.
APPLICATION FILED DEC. 8, 1916.
1,232,487.
Patented July 10, 1917.
2 SHEETS—SHEET 1.
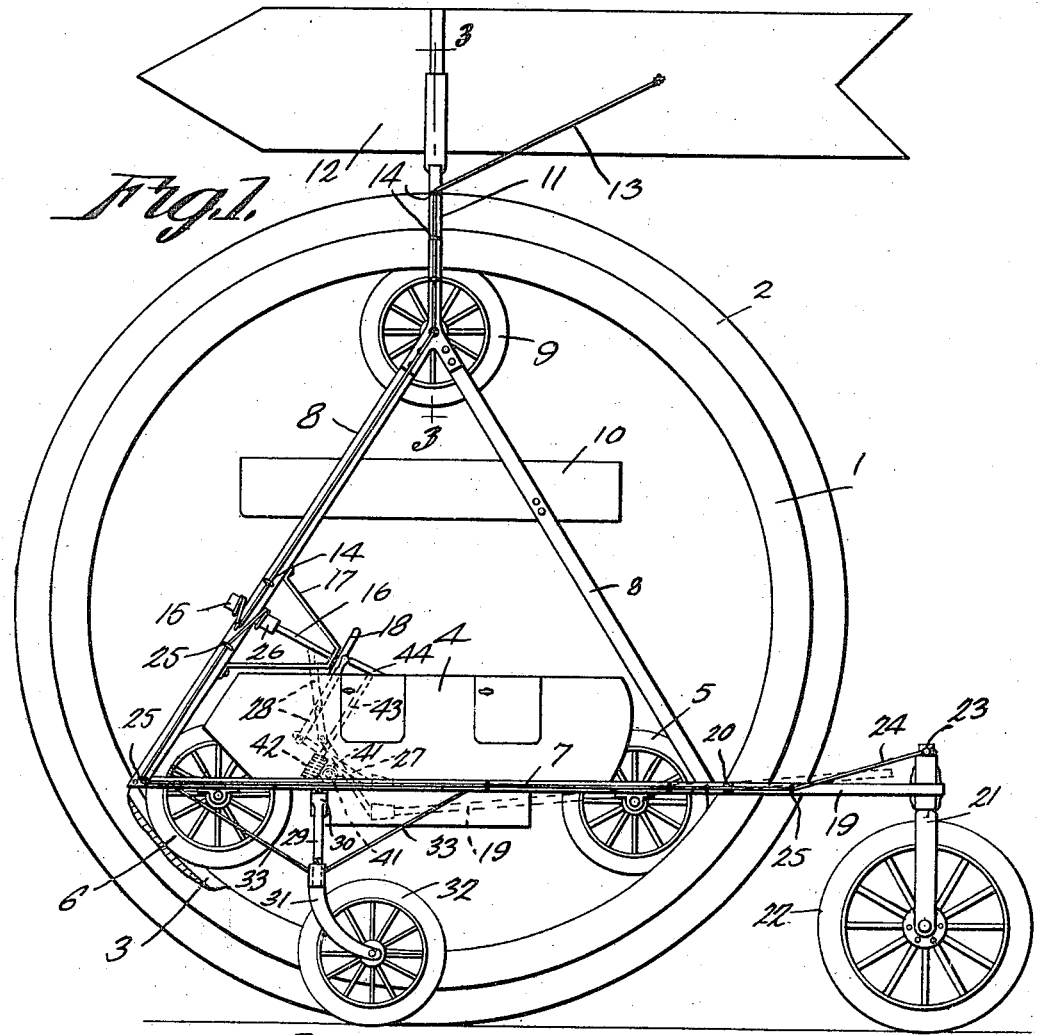
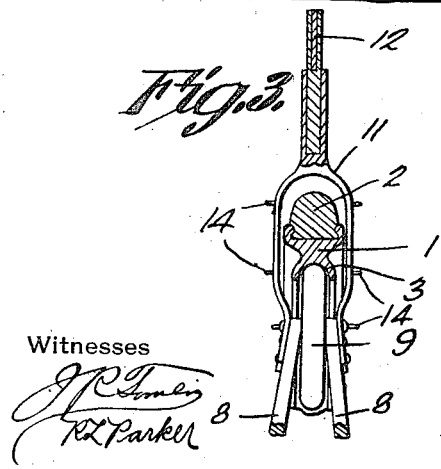
Witnesses
A. F. Brian, Inventor
by C. A. Snow & Co., Attorneys

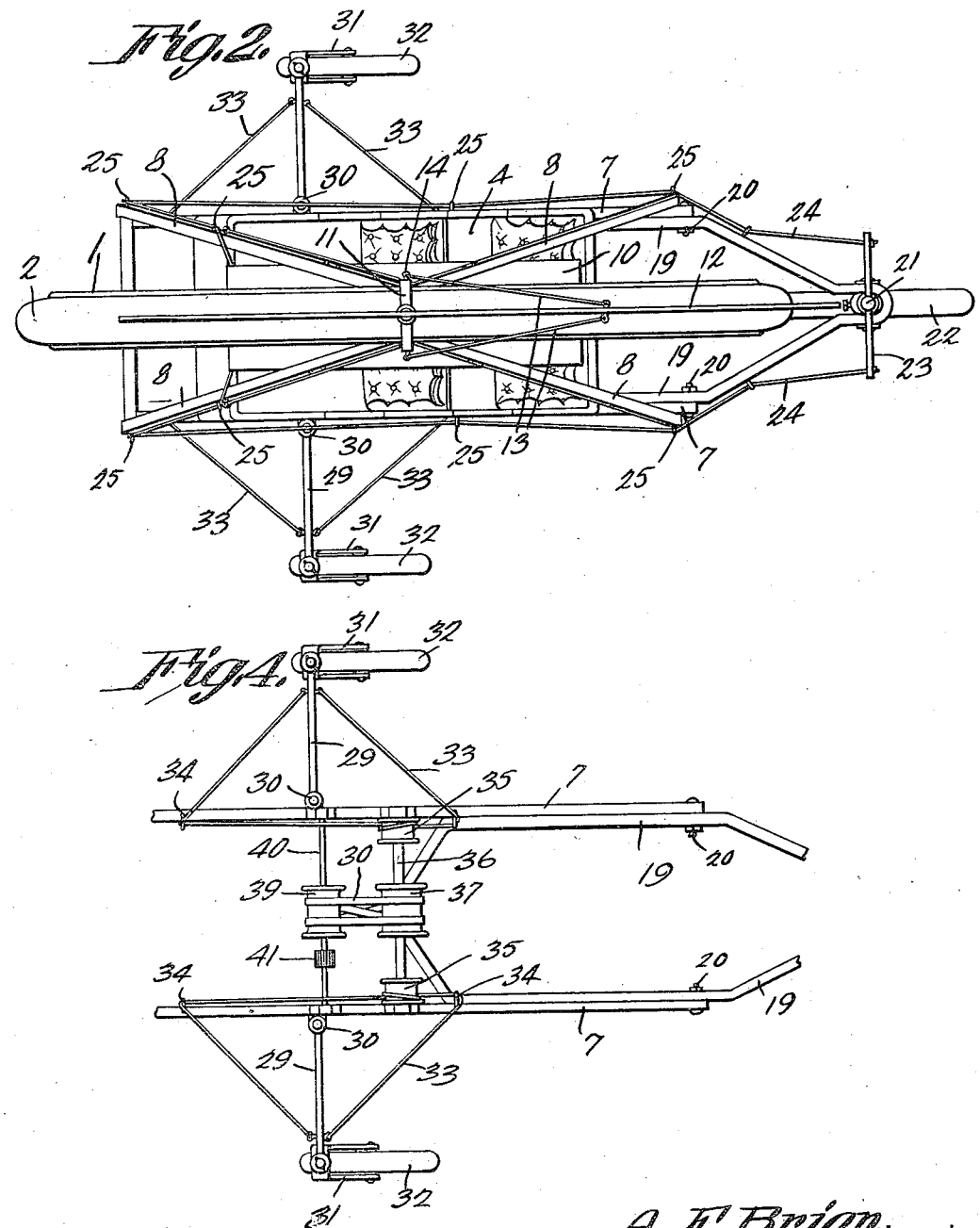

UNITED STATES PATENT OFFICE.

ALGIE F. BRIAN, OF CLOVIS, NEW MEXICO.

MONOMOBILE.

1,232,487.  Specification of Letters Patent.  Patented July 10, 1917.

Application filed December 8, 1916. Serial No. 135,851.

*To all whom it may concern:*

Be it known that I, ALGIE F. BRIAN, a citizen of the United States, residing at Clovis, in the county of Curry and State of New Mexico, have invented a new and useful Monomobile, of which the following is a specification.

The present invention relates to a monomobile or self-propelled vehicle having one main propelling wheel, and it is the object of the invention to provide a novel and improved vehicle of that type adapted to travel at great speed and over rough roads.

It is the object of the invention to provide a device of the nature indicated embodying a novel assemblage of the component elements, and including novel means for steering the device, and novel means for maintaining the equilibrium thereof when traveling at a slow rate of speed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a side elevation of the device.

Fig. 2 is a plan view thereof.

Fig. 3 is a vertical section taken on the line 3—3 of Fig. 1.

Fig. 4 is a fragmental plan view to illustrate the operating means of the equilibrium wheels.

In carrying out the invention, there is provided a single main propelling wheel embodying the rim or annulus 1 having a suitable tire 2 thereon, and provided with an inner annular groove 3. Disposed within the rim 1 near the lower portion thereof is a passenger body 4 in which the passengers are carried, and which can be of any suitable construction, similar to automobile bodies, and provided with rear and front wheels 5 and 6 rotating within the groove 3. The rear wheel 5 can be operated by an engine (not shown) as in automobiles, and suitable transmission mechanism and controlling devices can be provided, which need not be illustrated or described in detail since they are well known in automobile practice. The body 4 is attached to a horizontal longitudinal frame 7 which carries upwardly diverging standards 8 having journaled between their upper ends a guide wheel 9 working in the groove 3, and the interior non-rotatable frame within the rim 1 is thus provided with three wheels traveling in the groove 3, whereby the frame 7 and body 4 is held in the plane of the main propelling wheel, permitting said propelling wheel to rotate freely as the wheel 5 is actuated for propelling the vehicle. The standards 8 carry a shield or protector 10 for protecting the passengers from mud, dirt and water which is apt to drop from the top of the propelling wheel.

The upper end of the standards 8 are provided with a yoke 11 surrounding the upper portion of the propelling wheel, and a steering vane 12 is pivoted upon the yoke 11 to rotate about a vertical axis for steering the vehicle when traveling at a high speed.

In order to swing the vane 12 to steer the machine, cords or flexible elements 13 are attached to the vane 12 at opposite sides and are led through suitable guides 14 carried by the yoke 11 and forward standards 8, and said cords are wound upon a drum 15 secured on a steering shaft 16 journaled in a suitable bracket 17 and having a hand wheel 18. When the hand wheel is rotated to rotate the drum 15, one cord 13 is wound upon the drum and the other unwound, in order to swing the vane 12 correspondingly. When the vehicle is moving at a sufficiently high speed, the vane 12 in being angled or swung will serve to turn the propelling wheel in the desired direction, since the vanes will tend to travel in the path of least resistance, thereby turning the propelling wheel about a vertical axis, as will be apparent.

As a means for steering the vehicle when traveling at a low speed, a longitudinal frame 19 is pivoted between its ends, as at 20, to the rear portion of the main frame 7, and a vertical steering fork 21 is journaled for rotation in any suitable manner to the rear end of the main frame and carries a trailing steering wheel 22, and an upper transverse lever 23 having cords or flexible elements 24 attached thereto. Said cords 24 are led through suitable guides 25 carried by the frame 7 and forward standards 8, and are wound upon a drum 26 also secured upon the steering shaft 16, whereby when the wheel 18 is rotated, the cords 24 are moved in opposite directions for turning the steering fork 21 in order to steer the vehicle when the wheel 22 touches the ground.

The wheel 22 is lifted off of the ground when traveling at a high speed, and this is accomplished by depressing the forward end of the frame 19. This can be accomplished by means of a link 27 connecting the forward end of said frame and a lever 28 arranged to be operated by the operator. The wheel 22 can therefore be raised off of the ground and lowered onto the ground as the speed is increased and decreased, respectively. The steering vane 12 and steering wheel 22 are both connected to the steering shaft 16 so that the operation of the shaft 16 at any speed will serve to steer the vehicle.

The equilibrium of the vehicle is maintained when the vehicle is at a standstill or traveling at a slow rate of speed, by means of outstanding or laterally projecting arms 29 pivoted, as at 30, to the frame 7 to swing forwardly and rearwardly, castor forks 31 being journaled to the free ends of the arms 29 and carrying equilibrium wheels 32 to ride upon the ground at the opposite sides of the propelling wheel. The arms 29 are swung by the cords or flexible elements 33 attached thereto and passed through suitable guides 34 carried by the frame 7, said cords being wound upon drums 35 secured upon a transverse shaft 36 which in being rotated will wind up and unwind the cords 33 for moving the arms 29 forwardly and rearwardly, as desired. A drum 37 secured upon the shaft 36 is connected by a belt 38 with a drum 39 secured upon another transverse shaft 40. This shaft 40 can be rotated manually by means of a worm wheel 41 secured thereon and meshing with a worm 42 secured upon a shaft 43 having a hand wheel 44 adapted to be operated by the operator. Thus, by rotating the shaft 43, the arms 29 can be swung outwardly and forwardly to the position illustrated in Figs. 2 and 4, whereby the equilibrium wheels 32 will maintain the equilibrium of the vehicle when at a standstill or when moving slowly. When the vehicle is traveling at a sufficiently high rate of speed to maintain its equilibrium, the arms 29 are swung inwardly and rearwardly, thereby moving the wheels 32 likewise out of the way.

The present vehicle enables great speed to be obtained, due to the provision of the relatively large propelling wheel, and said wheel can travel over rough roads without the difficulty encountered by the use of small wheels on automobiles, the large propelling wheel passing readily over ruts and obstructions.

Having thus described the invention, what is claimed as new is:

1. A device of the character described embodying a rim, a frame within the rim, a plurality of wheels carried by the frame engaging the rim, a steering wheel connected to the frame for up and down movement, means for moving the steering wheel upwardly and downwardly out of and into engagement with the ground, and means for turning the steering wheel for steering said rim.

2. A device of the character described embodying a rim, a frame therein, a plurality of wheels carried by the frame engaging said rim, a secondary frame pivoted to the aforesaid frame, a steering wheel carried by the secondary frame, means for swinging the secondary frame to raise and lower the steering wheel, and means for turning said steering wheel for steering purposes.

3. In a device of the character described, a rim, a frame therein, wheels carried by the frame engaging said rim, means carried by said frame for steering the rim, arms pivoted to said frame adapted to be swung inwardly and outwardly about vertical points at opposite sides of the rim, caster forks pivoted to the arms, equilibrium wheels carried by said forks, and means carried by the frame for swinging said arms.

4. A device of the character described embodying a rim, a frame therein, wheels carried by the frame engaging the rim, a vane pivoted to the frame, a steering wheel connected to the frame for movement onto and off of the ground, operating means carried by the frame for swinging said frame and steering wheel, equilibrium wheels connected to the frame for movement into and out of operative position at opposite sides of the rim, and means carried by the frame for moving the equilibrium wheels.

In testimony that I claim the foregoing as my own, I have hereto affixed my signature.

ALGIE F. BRIAN.

Copies of this patent may be obtained for five cents each, by addressing the "Commissioner of Patents, Washington, D. C."